United States Patent
Kohli

(10) Patent No.: US 11,113,687 B2
(45) Date of Patent: Sep. 7, 2021

(54) SYSTEM FOR PERFORMING CROSS CARD AUTHENTICATION USING WALLET TRANSACTION AUTHENTICATION HISTORY

(71) Applicant: MasterCard International Incorporated, Purchase, NY (US)

(72) Inventor: Manoneet Kohli, O'Fallon, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 971 days.

(21) Appl. No.: 14/969,802

(22) Filed: Dec. 15, 2015

(65) Prior Publication Data

US 2017/0169421 A1 Jun. 15, 2017

(51) Int. Cl.
| | |
|---|---|
| *G06Q 20/36* | (2012.01) |
| *G06Q 30/04* | (2012.01) |
| *G06Q 10/00* | (2012.01) |
| *G06Q 20/40* | (2012.01) |
| *G06Q 20/12* | (2012.01) |
| *G06Q 20/22* | (2012.01) |
| *G06Q 20/38* | (2012.01) |

(52) U.S. Cl.
CPC ......... *G06Q 20/3674* (2013.01); *G06Q 10/00* (2013.01); *G06Q 20/12* (2013.01); *G06Q 20/227* (2013.01); *G06Q 20/36* (2013.01); *G06Q 20/382* (2013.01); *G06Q 20/4016* (2013.01); *G06Q 20/40145* (2013.01); *G06Q 30/04* (2013.01)

(58) Field of Classification Search
None
See application file for complete search history.

(56) References Cited

U.S. PATENT DOCUMENTS

| | | | |
|---|---|---|---|
| 2014/0172707 A1 | 6/2014 | Kuntagod et al. | |
| 2014/0289820 A1 | 9/2014 | Lindemann et al. | |
| 2015/0095206 A1 | 4/2015 | Van Heerden et al. | |
| 2015/0254639 A1* | 9/2015 | Radu | G06Q 20/3672 705/41 |

(Continued)

FOREIGN PATENT DOCUMENTS

| | | |
|---|---|---|
| CN | 102737313 A | 10/2012 |
| CN | 103093353 A | 5/2013 |
| CN | 103812835 A | 5/2014 |

OTHER PUBLICATIONS

Technologies for Payment Fraud Prevention: EMV, Encryption and Tokenization Oct. 2014, Smart Card Alliance (Year: 2014).*

(Continued)

*Primary Examiner* — David P Sharvin
(74) *Attorney, Agent, or Firm* — Buckley, Maschoff & Talwalkar LLC

(57) ABSTRACT

A method includes performing a first transaction using a first payment account. The first transaction includes a successful authentication of a holder of the first payment account. A record is stored of the first transaction. The record indicates that the successful authentication occurred. A request is received for a second transaction using a second payment account. The indication of the successful authentication is detected in the stored record of the first transaction. The second transaction is completed without requiring authentication of the account holder.

7 Claims, 7 Drawing Sheets

(56) References Cited

U.S. PATENT DOCUMENTS

2015/0356551 A1    10/2015  Dogin et al.
2016/0019547 A1*   1/2016   Gurnani ........... G06Q 20/40145
                                                            705/44

OTHER PUBLICATIONS

"PCT Notification of Transmittal of the International Search Report and the Written Opinion" International Searching Authority, dated Jan. 3, 2017 (Jan. 3, 2017), for International Application No. PCT/US2016/061285, 10pgs.
Chinese First Office Action dated Jul. 5, 2021 which was issued in counterpart application CN201680068908.3.
Smart Card Alliance: "Technologies Payment Prevention: Encryption Tokenization" https://www.emv-conne 20141031 ction.com/downloads/201 4/10/EMV-Tokenization-En cryption-WP-FINAL.pdf, Publication date Oct. 2014, Publication No. CP-14002.

* cited by examiner

SYSTEM FOR PERFORMING CROSS CARD AUTHENTICATION USING WALLET TRANSACTION AUTHENTICATION HISTORY

BACKGROUND

Payment accounts are in widespread use for both in-store and online purchase transactions. FIG. 1 is a block diagram of a previously proposed version of a payment system (generally indicated by reference numeral 100) as it may operate in connection with an online purchase transaction.

The system 100 includes an e-commerce server computer 102 that may be operated by or on behalf of an online merchant to permit online shopping transactions. For this purpose, as is well known, the e-commerce server computer 102 may host a shopping website, sometimes referred to as an "online store". A customer 103 who operates a customer device 104 may access the shopping website by communicating over the Internet 105 with the e-commerce server computer 102. As is very well-known to those who are skilled in the art, the customer device 104 may be, for example, a personal computer or notebook computer that runs a browser program, a tablet computer or smartphone that runs a mobile browser and/or a suitable app, etc. As is very familiar to those who shop online, after the customer has selected one or more items of merchandise for purchase from the online store, he/she may elect to enter a checkout phase of the online purchase transaction. In some situations, during the checkout phase, the customer enters payment information, such as a payment account number, expiration date, security code, etc. into an online form. However, according to some proposals, the customer may be presented with an option to select use of the customer's digital wallet, which has been stored in a wallet service provider's computer 106. The digital wallet may contain data relating to several of the customer's payment accounts, and selecting the digital wallet option may result in the customer being presented with the opportunity to select one of those payment accounts for use in the current online purchase transaction. Upon the customer indicating selection of one of the accounts in the digital wallet, the wallet service provider 106 may make the corresponding data (again, payment account number, expiration date, security code, etc.) for the selected account available to the merchant's e-commerce server 102.

In connection with the online purchase transaction, the e-commerce server computer 102 may transmit a transaction authorization request message (sometimes simply referred to as an "authorization request") to the merchant's acquirer financial institution ("acquirer" or "transaction acquirer"), indicated by reference numeral 110. Assuming that the digital wallet scenario described above had occurred, the authorization request may include the payment data provided from the wallet service provider 106 to the e-commerce server 102.

The acquirer 110 may route the authorization request via a payment network 112 to a server computer 114 operated by the issuer of the payment account that corresponds to the payment data included in the authorization request. Also, the authorization response generated by the issuer server computer 114 may be routed back to the acquirer 110 via the payment network 112. The acquirer 110 may confirm to the merchant (i.e., to the e-commerce server computer 102) that the transaction has been approved.

The payment network 112 may be, for example, the well-known Banknet® system operated by MasterCard International Incorporated, which is the assignee hereof.

The components of the system 100 as depicted in FIG. 1 are only those that are needed for processing a single transaction. Those who are skilled in the art will recognize that in the real world, online shopping and payment systems may process many purchase transactions (including simultaneous transactions) and may include a considerable number of payment account issuers and their computers, a considerable number of acquirers and their computers, and numerous merchants and their e-commerce servers. The system may also include a very large number of customers/online shoppers, who hold payment accounts that they use for their online shopping activities. In some environments there may also be a number of wallet service providers. It is also well known that elements of the system 100 (e.g., acquirers, the payment network, payment account issuers) may play similar roles in connection with in-store purchase transactions and in other types of transactions.

In some online transactions, a user authentication procedure may be included to help guard against fraudulent transactions. For example, some user authentication procedures may include biometric processing. That is, the customer/user may be challenged to provide a biometric characteristic (e.g., a fingerprint/thumbprint) to the customer's device. Data representative of the submitted biometric characteristic may be uploaded to a remote authentication service (not shown in FIG. 1). The authentication service may verify the uploaded biometric data against previously stored biometric reference data for the user to complete the user authentication. In other types of user authentication procedures, the user may be prompted to enter a PIN (personal identification number) or other data that is intended to be maintained as a secret by the user.

There is often a trade-off between requirements for security measures, such as user authentication, versus convenience for the customer. Moreover, customer convenience can be a critical factor in e-commerce businesses, since in many cases a customer who actually intends to purchase and has selected merchandise may abandon the transaction and navigate away from the online store website if the checkout phase entails more steps and/or more delays than the customer is willing to tolerate. Online merchants are eager to avoid abandonment of transactions, as just described, while at the same time the merchants and account issuers also wish to take prudent measures to combat fraud.

BRIEF DESCRIPTION OF THE DRAWINGS

Features and advantages of some embodiments of the present disclosure, and the manner in which the same are accomplished, will become more readily apparent upon consideration of the following detailed description of the disclosure taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present disclosure, an authentication service for online transactions may keep records of transactions in which a strong user authentication process, such as a biometric process, has been successfully performed. Based on the record(s) of successful user authentication, the authentication service may cause user authentication processes to be skipped in subsequent transactions in which, for example, the user is employing a payment account held in the same digital wallet with the account used for the transaction(s) in which strong user authentication took place. In some embodiments, the skipping of user authentication may continue for only a pre-set period of time after the initial transaction(s) in which user authentication occurred.

Figure 1:
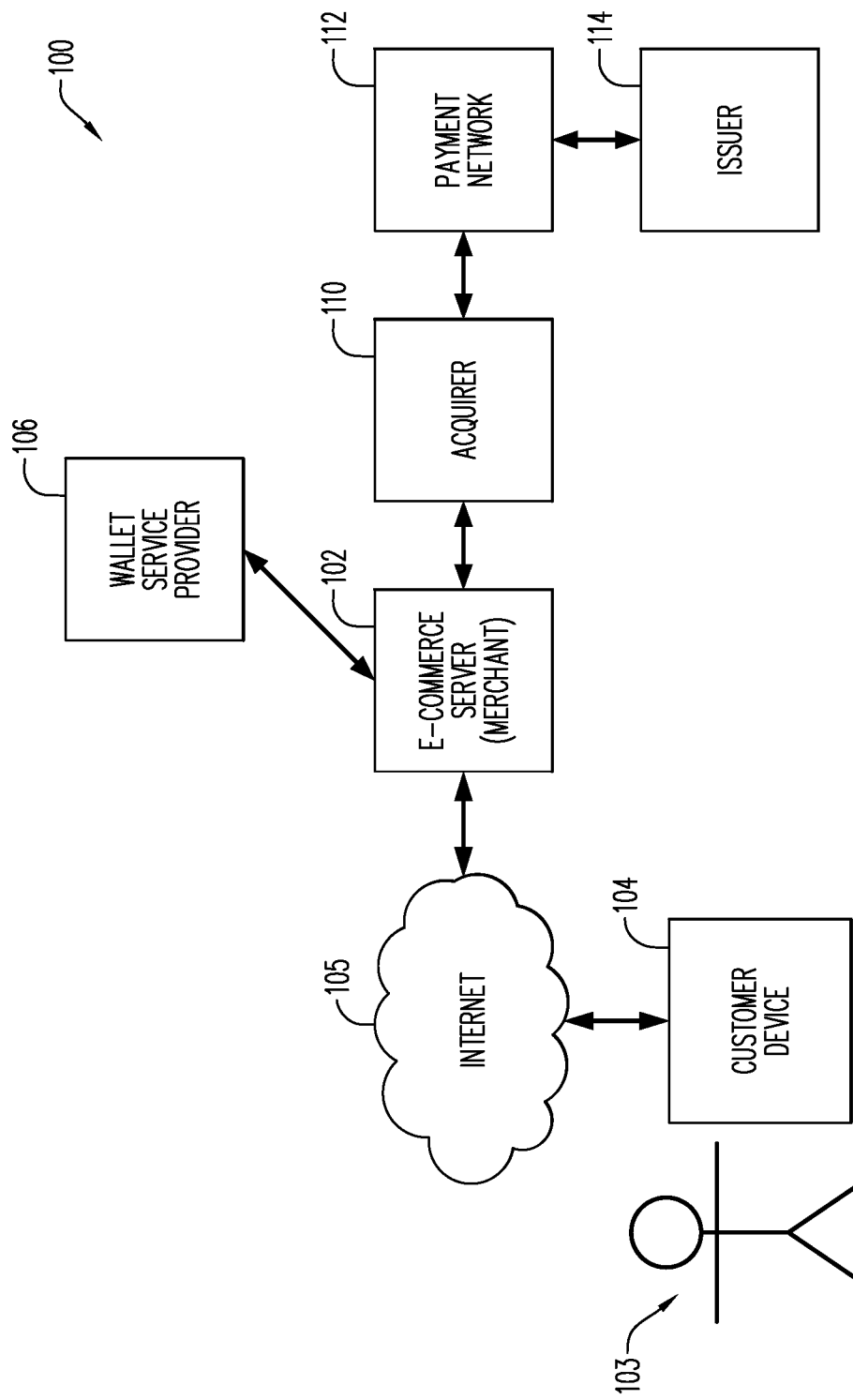
FIG. 1 is a block diagram that illustrates a conventional system that handles online purchase transactions.
Figure 2:
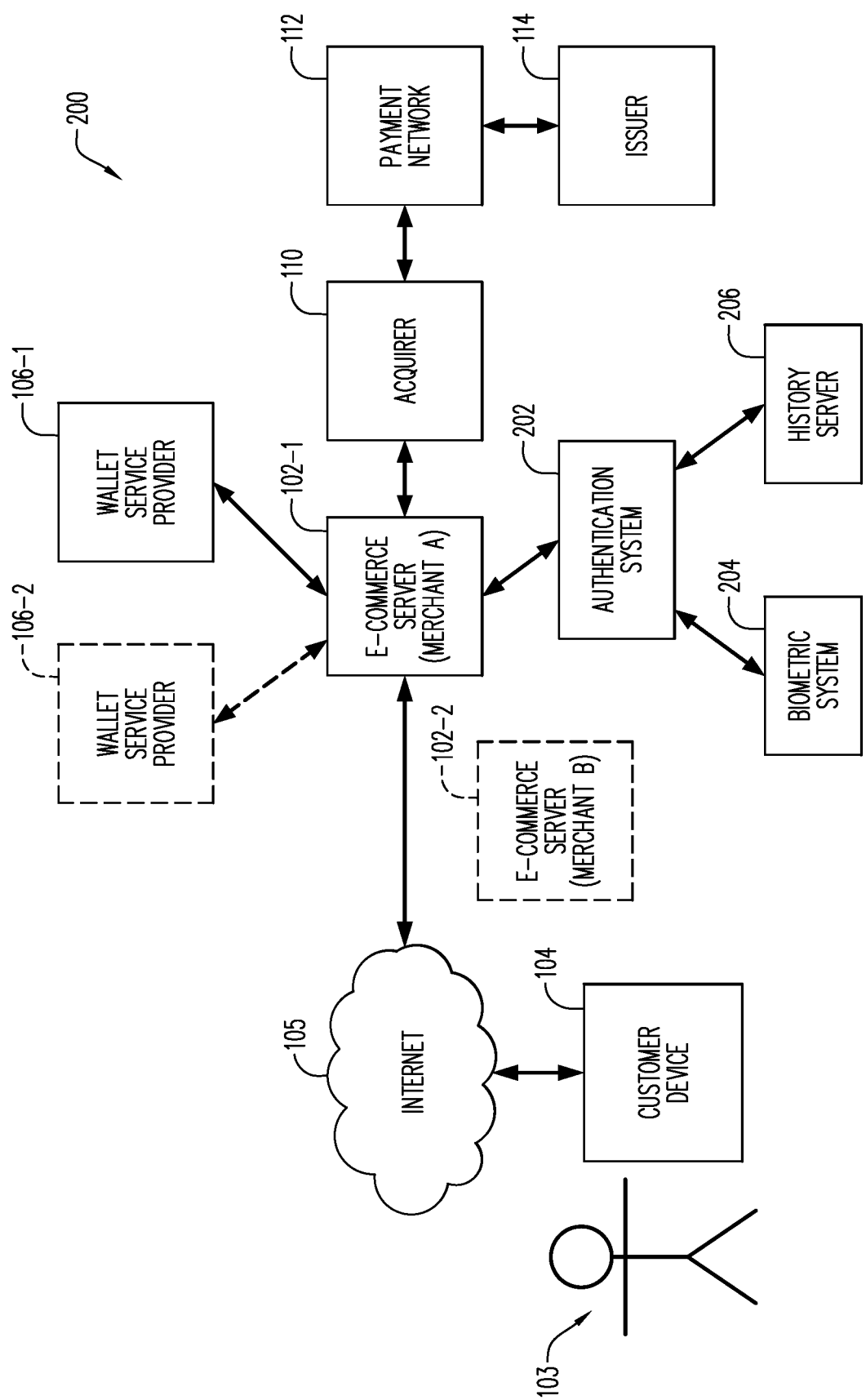
FIG. 2 is a block diagram of a payment system according to some embodiments.

FIG. 2 is a block diagram of a payment system 200 provided according to some embodiments. The payment system 200 incorporates all of the elements referred to above in connection with FIG. 1. For example, elements/entities 103, 104, 105, 110, 112 and 114 are carried over in the payment system 200 as depicted in FIG. 2 from the depiction of the payment system 100 shown in FIG. 1. Further, an element designated by the reference numeral 102-1 (e-commerce server) in FIG. 2 corresponds to the element designated by reference numeral 102 in FIG. 1. Also, an element designated by the reference numeral 106-1 (wallet service provider) in FIG. 2 corresponds to the element designated by reference numeral 106 in FIG. 1.

Moreover, and as a reflection of teachings of the present disclosure—according to which, events that occur in one transaction have a bearing on steps taken or not taken in another transaction—another e-commerce server 102-2 is shown in phantom in FIG. 2. The depiction of e-commerce server 102-2 in FIG. 2 is intended to suggest functionality of the payment system 200 such that the customer 103 may—after engaging in an online transaction with the e-commerce server 102-1—at a subsequent point in time engage in another online transaction via the e-commerce server 102-2. Thus while FIG. 2 for the most part depicts aspects of the payment system 200 pertinent to a single transaction, the depiction in FIG. 2 further suggests two or more transactions in sequence that may be engaged in by the customer 103 via the payment system 200. (It is to be noted that a further and additional acquirer—not shown—may be involved in a later transaction as the transaction acquirer for the merchant that operates the e-commerce server 102-2; also, in a case where the customer 103 uses a different payment account in the later transaction, a further and additional account issuer—not shown—may be involved as the issuer of the payment account used in the later transaction.)

Still further, FIG. 2 depicts in phantom an additional wallet service provider 106-2, so as to suggest that the customer may have more than one digital wallet, with one digital wallet maintained at wallet service provider 106-1 and another digital wallet maintained at wallet service provider 106-2.

According to aspects of the present disclosure, the payment system 200 also includes an authentication system 202. Details of the authentication system 202 will be discussed below. To briefly summarize some of the functionality of the authentication system 202, it manages user authentication processes in connection with online purchase transactions; also in accordance with teachings of the present disclosure, the authentication system 202 selectively omits user authentication from some transactions in situations when recent transaction history indicates that the need for/benefits from user authentication are reduced for a current transaction. In some embodiments, the authentication system 202 may be operated by the operator of the payment network 112.

The payment system 200 may further include a biometric system 204. The biometric system 204 may be in communication with the authentication system 202. Under direction from the authentication system 202, the biometric system 204 may handle biometric-based user authentication processes in connection with online purchase transactions. Further details of the biometric system 204 are described below.

Still further, the payment system 200 may include a history server computer 206. The history server computer 206 may be in communication with the authentication system 202. The history server computer 206 may function as a repository for transaction history data to support determinations by the authentication system 202 as to when it is advisable to omit user authentication from the flow of events in connection with a given online purchase transaction.

The biometric system 204 and the history server computer 206 may be under common operation with the authentication system 202.

To discuss the subject matter of FIG. 2 more generally, it should be understood that in most cases, blocks labeled therein with names/descriptions of entities should also be understood to represent computer systems operated by or for such entities.

It should also be understood that, for at least some types of participants in the payment system 200, there may be a considerable or even a very large number of participants of those types in practical embodiments of the payment system 200. Moreover, one or more components of the payment system 200 may handle in-store purchase transactions and/or other types of transactions in addition to online purchase transactions.

In some embodiments, any two or more of the authentication system 202, the biometric system 204, and/or the history server computer 206 may be constituted by components of an interrelated and/or integrated computer system and/or may be housed together in a single data center.

Figure 3:
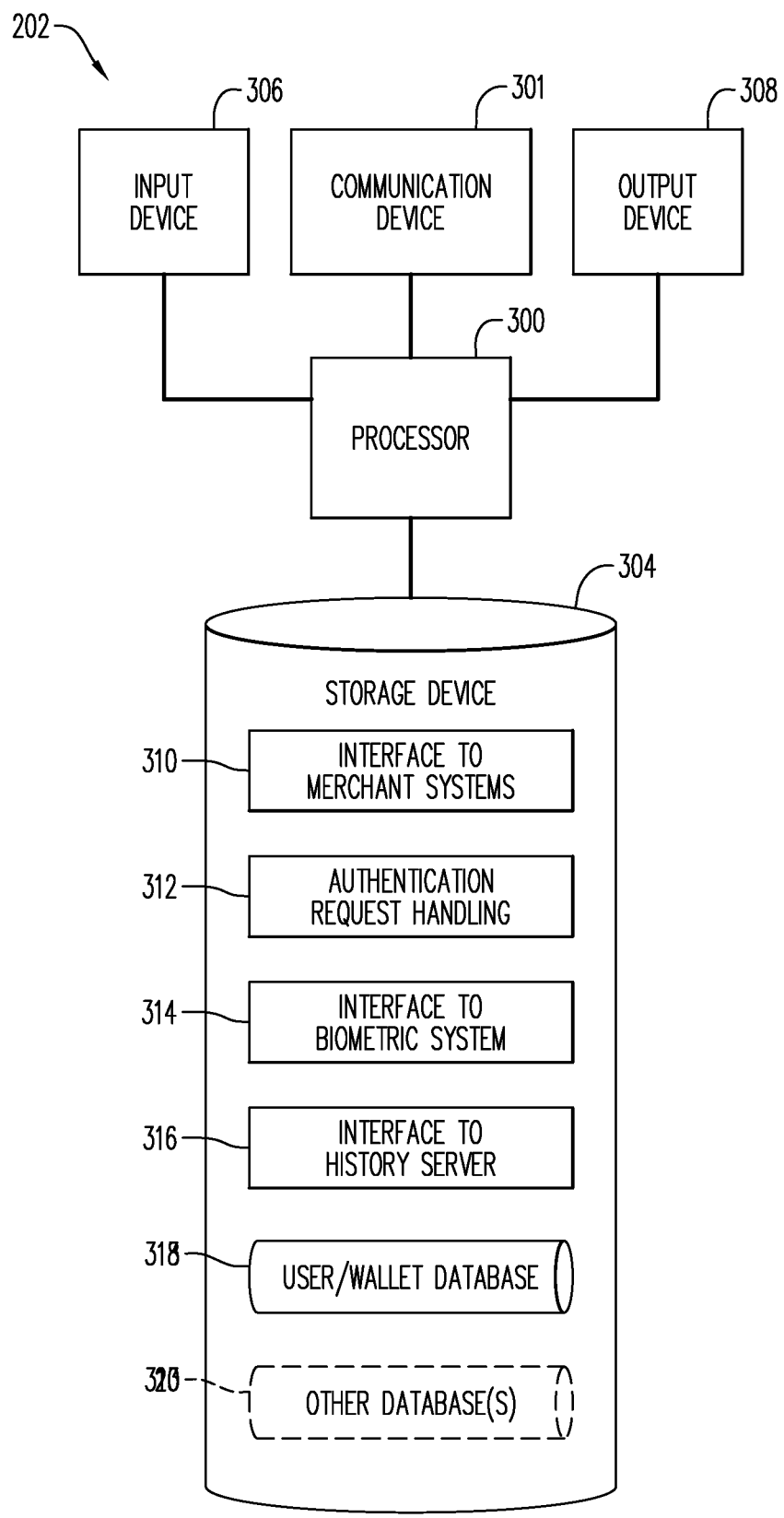
FIGS. 3, 4 and 5 are block diagram representations of computers that may serve as components of the system shown in FIG. 2.

FIG. 3 is a block diagram representation of an embodiment of the authentication system 202.

In some embodiments, hardware aspects of the authentication system 202 may be constituted by typical server computer hardware, but may be controlled by software to cause it to function as described herein.

The authentication system 202 may include a processor 300 operatively coupled to a communication device 301, a storage device 304, an input device 306 and an output device 308. The communication device 301, the storage device 304, the input device 306 and the output device 308 may all be in communication with the processor 300.

The processor 300 may be constituted by one or more processors. The processor 300 may operate to execute processor-executable steps, contained in program instructions described below, so as to control the authentication system 202 to provide desired functionality.

Communication device 301 may be used to facilitate communication with, for example, other devices (such as e-commerce servers, the biometric system 204, the history server computer 206). For example, communication device 301 may comprise numerous communication ports (not separately shown), to allow the authentication system 202 to perform its roles in connection with numerous simultaneous online purchase transactions.

Input device 306 may comprise one or more of any type of peripheral device typically used to input data into a computer. For example, the input device 306 may include a keyboard and a mouse. Output device 308 may comprise, for example, a display and/or a printer.

Storage device 304 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 304 stores one or more programs for controlling processor 300. The programs comprise program instructions (which may be referred to as computer readable program code means) that contain processor-executable process steps of the authentication system 202, executed by the processor 300 to cause the authentication system 202 to function as described herein.

The programs may include one or more conventional operating systems (not shown) that control the processor 300 so as to manage and coordinate activities and sharing of resources in the authentication system 202, and to serve as a host for application programs (described below) that run on the authentication system 202.

The programs stored in the storage device 304 may also include a software interface 310 that controls the processor 300 to support communication between the authentication system 202 and merchant e-commerce servers such as the computers represented by blocks 102-1 and 102-2 in FIG. 2.

Further, the storage device 304 may store an authentication request handling application program 312. The authentication request handling application program 312 may control the processor 300 such that the authentication system 202 provides functionality as described herein in connection with requests for user authentication related to online purchase transactions.

Still further, the storage device 304 may store a software interface 314 that controls the processor 300 to support interactions between the authentication system 202 and the biometric system 204. In addition, the storage device 304 may store a software interface 316 that controls the processor 300 to support access of the authentication system 202 to the history server computer 206.

The storage device 304 may also store, and the authentication system 202 may also execute, other programs, which are not shown. For example, such programs may include a reporting application, which may respond to requests from system administrators for reports on the activities performed by the authentication system 202. The other programs may also include, e.g., device drivers, database management programs, communications software, etc.

The storage device 304 may also store a user and wallet database 318 that is referenced by the authentication request handling application program 312 for the purpose of determining when to omit user authentication from the events involved in a given online purchase transaction. Data identifying users and/or their wallets may be registered and stored in the user and wallet database 318 in advance of subsequent uses of payment accounts stored in the digital wallets belonging to system users.

In some embodiments, the storage device 304 may also store one or more databases (reference numeral 320) required for operation of the authentication system 202.

Figure 4:
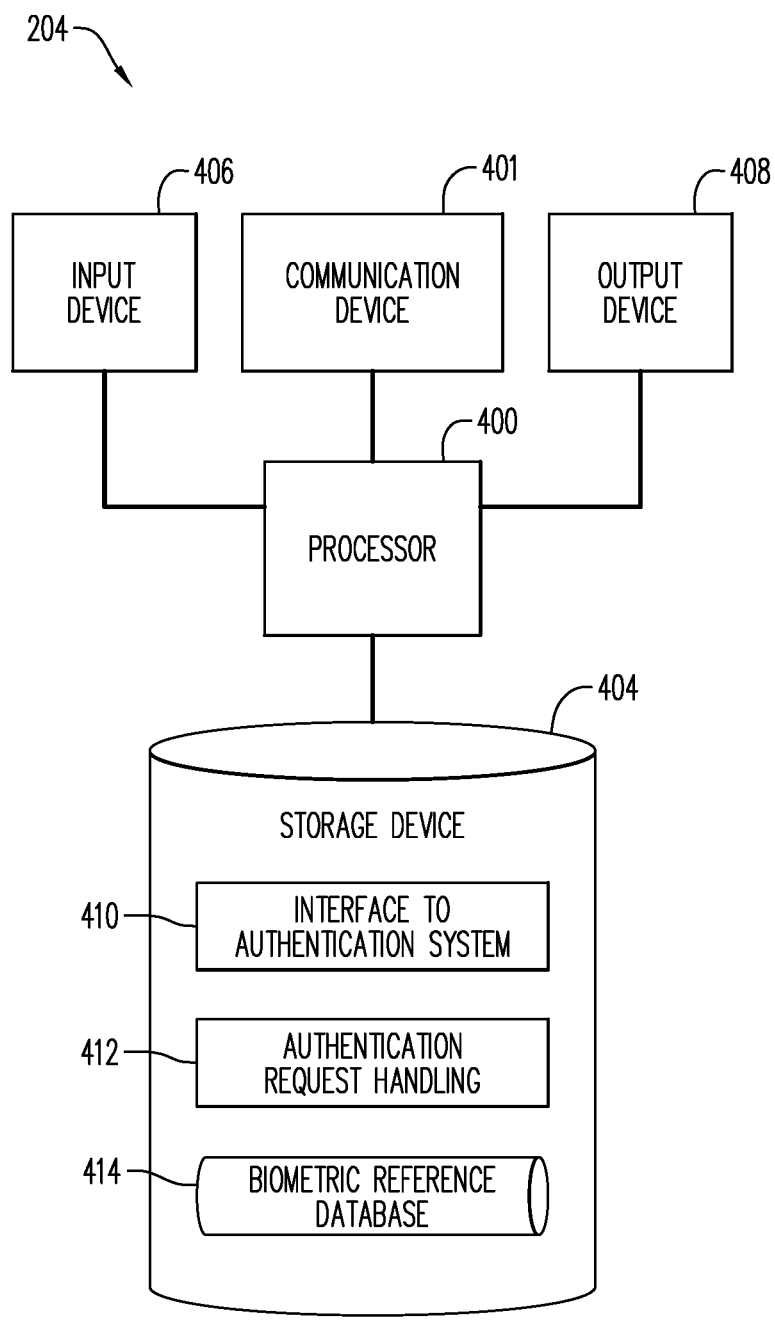

FIG. 4 is a block diagram of an embodiment of the biometric system 204.

In its hardware architecture and components, the biometric system 204 may, for example, resemble the hardware architecture and components described above in connection with FIG. 3. However, the biometric system 204 may be programmed differently from the authentication system 202 so as to provide different functionality.

Returning again to the hardware aspects of the biometric system 204, it may include a processor 400, a communication device 401, a storage device 404, an input device 406 and an output device 408. The communication device 401, the storage device 404, the input device 406 and the output device 408 may all be in communication with the processor 400.

The above descriptions of the hardware components shown in FIG. 3 may, in some embodiments, also be applicable to the like-named components shown in FIG. 4.

Storage device 404 stores one or more programs for controlling processor 400. The programs comprise program instructions (which may be referred to as computer readable program code means) that contain processor-executable process steps of the biometric system 204, executed by the processor 400 to cause the biometric system 204 to function as described herein.

The programs may include one or more conventional operating systems (not shown) that control the processor 400 so as to manage and coordinate activities and sharing of resources in the biometric system 204, and to serve as a host for application programs (described below) that run on the biometric system 204.

The programs stored in the storage device 404 may include a software interface 410 that controls the processor 400 to support interactions between the biometric system 204 and the authentication system 202.

Further, the storage device 404 may store an authentication request handling program 412 that handles requests that the biometric system 204 conduct a biometric user authentication process with respect to particular online purchase transactions.

The storage device 404 may also store, and the biometric system 204 may also execute, other programs, which are not shown. For example, such programs may include a reporting application, which may respond to requests from system administrators for reports on the activities performed by the biometric system 204. The other programs may also include, e.g., device drivers, database management programs, communication software, etc.

The storage device 404 may also store a database 414 of biometric reference data. The biometric reference data may have been stored in connection with enrollment and/or registration of users, and may be employed to verify biometric data collected from users in connection with online purchase transactions.

Figure 5:
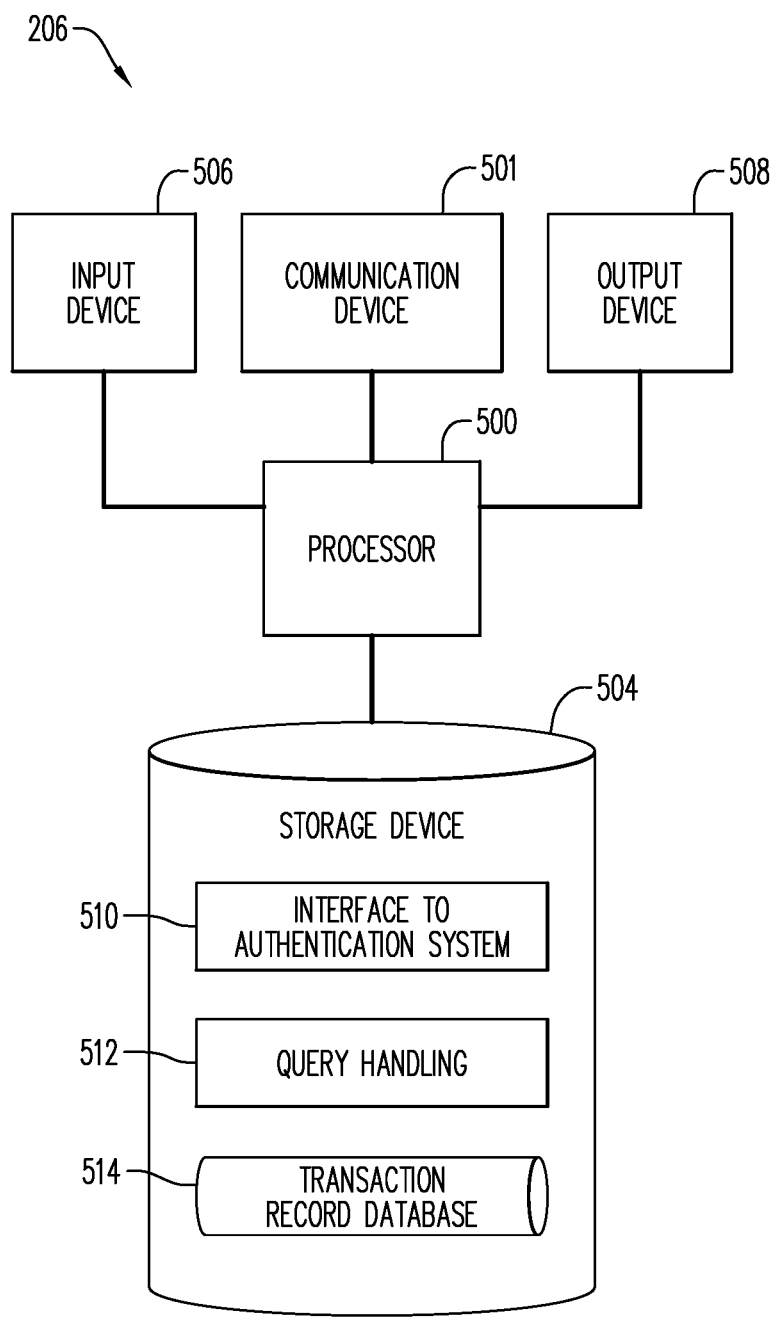

FIG. 5 is a block diagram of an embodiment of the history server computer 206.

In its hardware architecture and components, the history server computer 206 may, for example, resemble the hardware architecture and components described above in connection with FIG. 3. However, the history server computer 206 may be programmed differently from the authentication system 202 and the biometric system 204 so as to provide different functionality.

Returning again to the hardware aspects of the history server computer 206, it may include a processor 500, a communication device 501, a storage device 504, an input device 506 and an output device 508. The communication device 501, the storage device 504, the input device 506 and the output device 508 may all be in communication with the processor 500.

The above descriptions of the hardware components shown in FIG. 3 may, in some embodiments, also be applicable to the like-named components shown in FIG. 5.

Storage device 504 stores one or more programs for controlling processor 500. The programs comprise program instructions (which may be referred to as computer readable program code means) that contain processor-executable process steps of the history server computer 206, executed by the processor 500 to cause the history server computer 206 to function as described herein.

The programs may include one or more conventional operating systems (not shown) that control the processor 500 so as to manage and coordinate activities and sharing of resources in the history server computer 206, and to serve as a host for application programs (described below) that run on the history server computer 206.

The programs stored in the storage device 504 may include a software interface 510 that controls the processor 500 to support interactions between the history server computer 206 and the authentication system 202.

Further, the storage device 504 may store query handling program 512 that handles requests from the authentication system 202 for access to transaction history data maintained in the history server computer 206.

The storage device 504 may also store, and the history server computer 206 may also execute, other programs, which are not shown. For example, such programs may include a reporting application, which may respond to requests from system administrators for reports on the activities performed by the history server computer 206. The other programs may also include, e.g., device drivers, database management programs, communication software, etc.

The storage device 504 may also store a database 514 of transaction history data. The transaction history data may be transmitted to the history server computer 206 for storage in the database 514 contemporaneously with the handling of authentication requests for the transactions by the authentication system 202. The transaction history data may also be accessible via queries submitted by the authentication system 202.

Other computer components of the payment system 200 (FIG. 2) may also have the same type of hardware architecture and/or components as described above in connection with FIG. 3, and may be suitably programmed for the respective roles of those computer components.

Figure 6A:
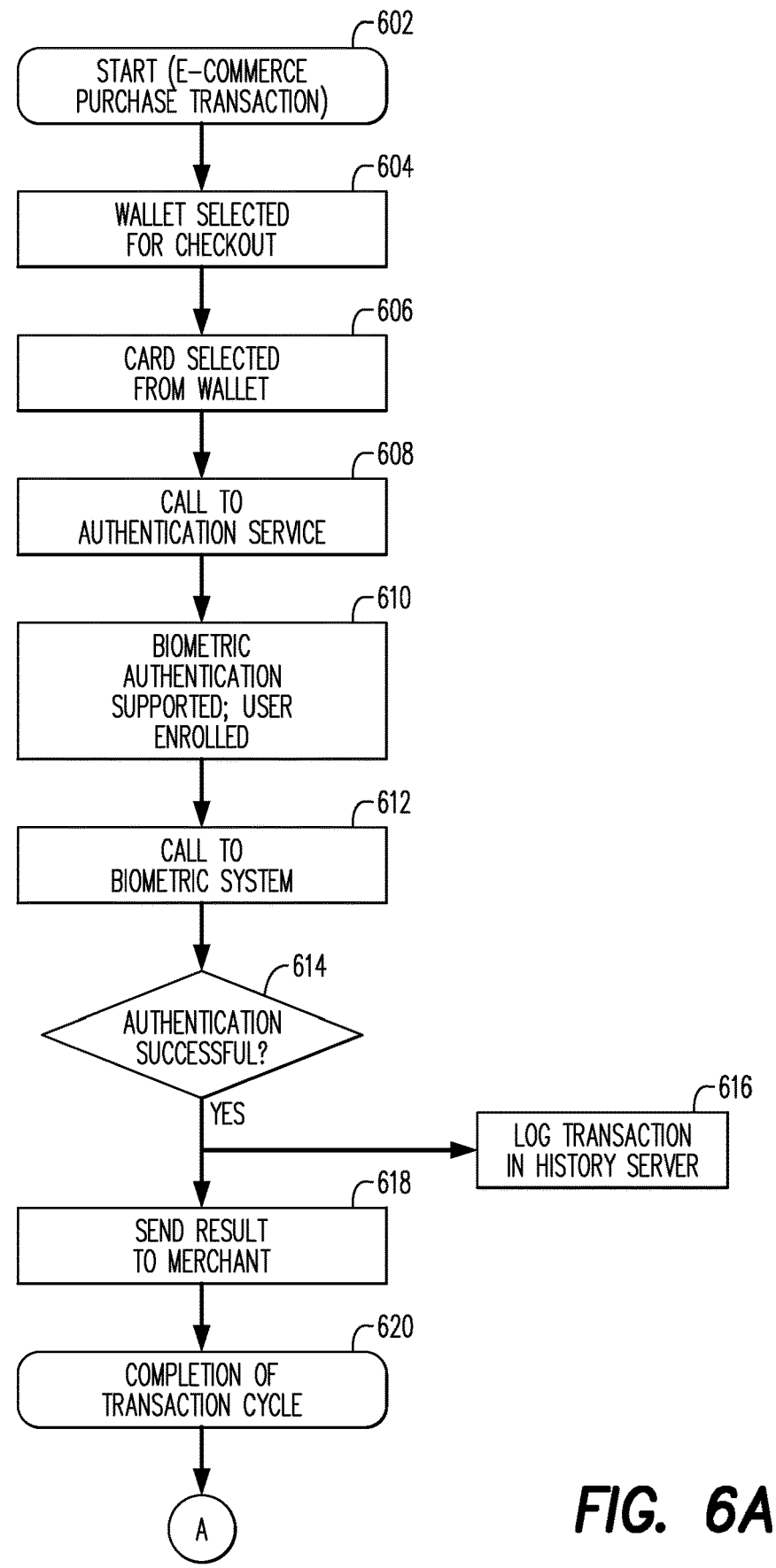
FIGS. 6A and 6B together form a flow chart that illustrates aspects of the present disclosure.
Figure 6B:
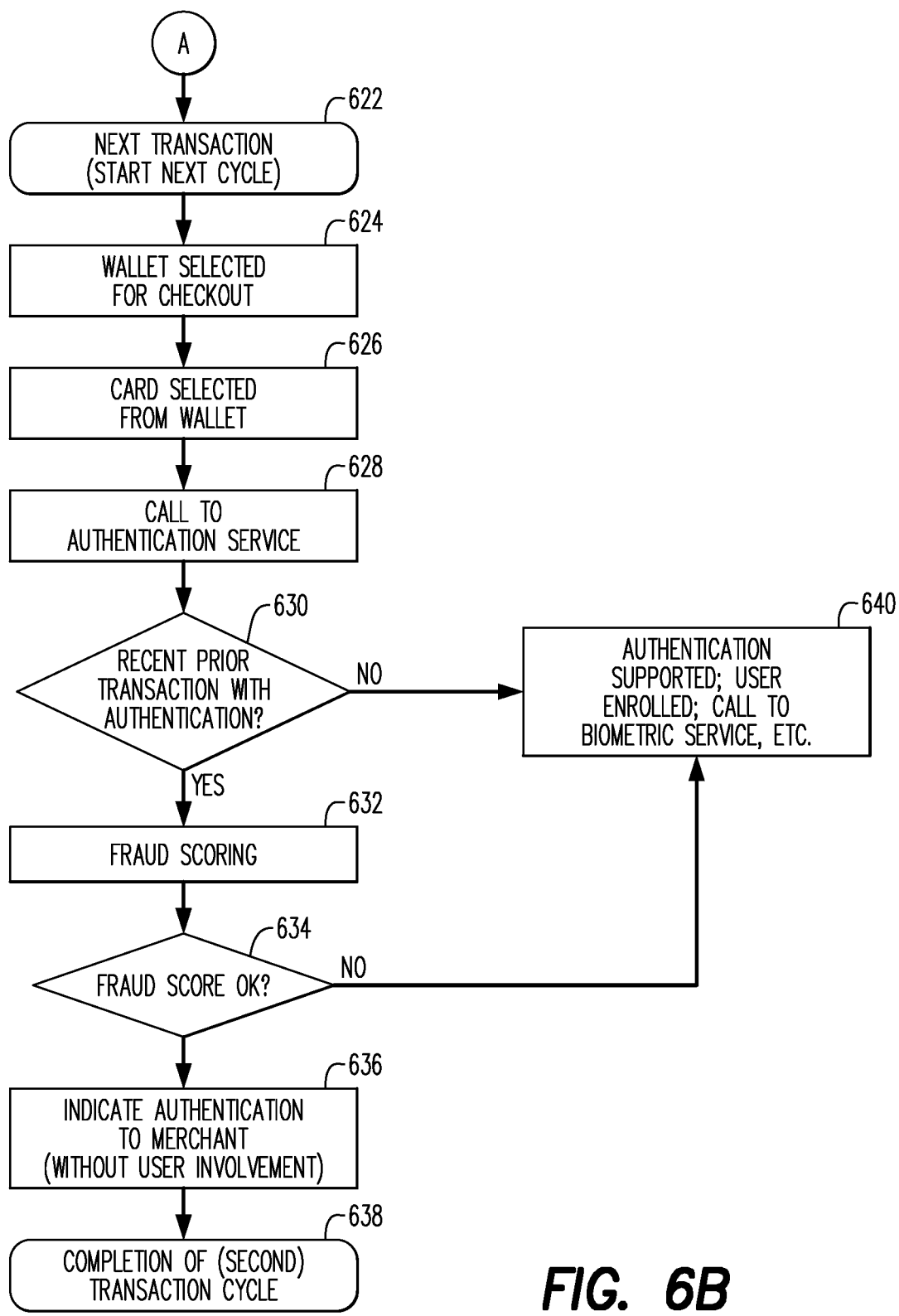

FIGS. 6A and 6B together form a flow chart that illustrates aspects of the present disclosure. In particular, the flow chart of FIGS. 6A/6B illustrates a process that may be performed in the payment system 200 in some embodiments.

As indicated by block 602 in FIG. 6A, the process may begin with a user's initiation of an online purchase transaction, of a kind previously described herein. For present purposes, it is assumed that the online purchase transaction is via the e-commerce server 102-1 depicted in FIG. 2.

As indicated at block 604, it is assumed that the user selected a digital wallet function for checkout in connection with the transaction. At block 606, it is indicated that the user has selected a particular payment account from his or her digital wallet for use in the current transaction. Next, as indicated at block 608, the authentication system 202 is called to handle a user authentication process to aid in securing the current transaction against fraud. (The call to the authentication system 202—like a similar step described below for a subsequent transaction—may include an indication that the transaction is wallet-based and may provide a wallet identifier.) It may be assumed, for example, that one or more rules set by the account issuer and/or the parameters of the transaction (e.g., one or more of: merchant identity and/or category, monetary amount of the transaction, nature of the merchandise being purchased, current time of day/day of week, geographic location of merchant, etc.) may call for user authentication to be performed for the transaction. It is further assumed that the issuer rules and/or transaction parameters call for biometric user authentication to be employed, and that user authentication of this type had previously been set up with this user (see block 610, FIG. 6A).

At block 612 in FIG. 6A, the authentication system 202 places a function call to the biometric system 204 to request that the biometric system 204 conduct a biometric-based user authentication process with respect to the current transaction. For example, a fingerprint/thumbprint scan and verification of the resulting input biometric data may take place.

A decision block 614 may follow block 612 in the process of FIGS. 6A/6B. At decision block 614, it may be determined whether the biometric-based user authentication process was completed successfully (i.e., the submitted biometric data was verified). If so, then, in parallel, two process blocks, namely blocks 616 and 618, may follow decision block 614.

At block 616, the authentication system 202 may log a suitable record in the history server computer 206. For example, the record may indicate that biometric-based user authentication was successfully performed at the current date and time. The record may also identify the payment account (e.g., by PAN) with respect to which the user authentication occurred. In some embodiments, the record may additionally or alternatively identify the user and/or the user digital wallet for the current transaction. In some embodiments, the record may also or alternatively record the geographic region or location of the user's device, as determined by the device Internet Protocol address (so-called "geo i.p."), for use in current or subsequent risk management processes.

At block 618, the authentication system 202 may supply the result of the user authentication process (assumed in this case to be successful biometric-based authentication) to the merchant e-commerce server.

In some embodiments, the record of the user authentication and/or the report to the merchant may include an indication of the type of biometric measurement employed (e.g., fingerprint scan vs. facial scan vs. voice recognition, etc.).

Block 620 may follow block 618 in the process of FIGS. 6A/6B. At block 620, and in response to the indication that user authentication is successful, the merchant may complete the transaction. This may include the merchant sending an authorization request via its transaction acquirer to the account issuer, receiving back an authorization response, indicating to the user that the transaction is complete, and initiating a process for shipment of the selected merchandise. In some embodiments, the authorization request may include an indication that user authentication was successfully performed. The latter indication may be considered by the account issuer as part of its risk management processing related to handling of the authorization request.

In some embodiments, apart from the processing at block 616, the process through blocks 602 to 620 may be performed in accordance with conventional practices.

It is next assumed that the user goes on to engage in another e-commerce transaction—e.g., with a different merchant—at a point in time not very much later than the conclusion of the first transaction as indicated at 620. Thus, the start of the later transaction is indicated by block 622 in FIG. 6B. It is further assumed that—as indicated at block 624—the user has again selected a digital wallet function in connection with the checkout phase for the later transaction. In some situations, the same digital wallet may be selected as in the first transaction; in some situations—assuming the user has more than one digital wallet—the user may have selected a different digital wallet from the digital wallet used in the first transaction.

Block 626 may follow block 624. At block 626, the user may select a particular payment account for the current (i.e., the later) transaction from the digital wallet selected in block 624. In some situations, the same payment account may be selected as in the first transaction; in some situations a different payment account may be selected. In some situations, if the payment account selected at 626 is different from the payment account used for the first transaction, the former payment account may be held in the same digital wallet with the latter payment account. In some situations, the former payment account may be held in a different digital wallet from the former payment account and/or in a different digital wallet from the digital wallet accessed in connection with the first transaction.

Block 628 may follow block 626. At block 628, the authentication system 202 is called to engage in a user authentication process in connection with the second transaction. However, in accordance with aspects of the present disclosure, the authentication system 202 may determine, in at least some cases, that the user should be considered authenticated—without actually engaging in a user authentication process—in view of a recent successful user authentication. As will be seen, this determination may be made on the basis of rules. Examples of such rules will be described below.

In the process of FIGS. 6A/6B, a decision block 630 may follow block 628. At decision block 630, the authentication system 202 may determine whether a relevant previous user authentication is recorded in the history server computer 206. A recorded previous user authentication may be deemed "relevant" if one or more rules indicate that the occurrence of the previous user authentication is to be considered by the authentication system 202 in determining whether or not to omit engaging in a user authentication process for the current (i.e., the later) transaction. The relevance or not of a previous user authentication may depend on factors such as (a) whether or not the payment account selected for the current transaction is the same as the payment account selected for the previous transaction; (b) whether or not the payment account selected for the current transaction is held in the same digital wallet as the payment account selected for the previous transaction; (c) whether or not the payment account selected for the current transaction is held in a digital wallet that includes a payment account that is also held in the digital wallet that was used in the previous transaction; (d) the time elapsed between the previous transaction and the current transaction; and/or (e) other attributes of the current transaction, including for example the monetary amount to be paid in the current transaction, the nature of the goods or services to be purchased, the identity or category of the merchant, the time of day in the merchant's time zone, etc.

If a positive determination is made at decision block 630 (i.e., if the authentication system 202 determines that a relevant user authentication is recorded in the history server computer 206), then block 632 may follow decision block 630. At block 632, the authentication system 202 may perform a likelihood-of-fraud scoring process with respect to the current transaction. This latter process may resemble known risk management algorithms. For example, factors such as the transaction amount, the identity or category of the merchant, the user's typical spending patterns, the geographic location of the merchant, the type of goods or services being purchased and/or other factors may be considered to determine whether the current transaction presents a high or low risk that it is fraudulent. An outcome of the fraud scoring process may be a numerical fraud score (e.g. on a 1 to 5 scale of integer scores). The determination of the fraud score may consider, among other factors, whether the geo i.p. of the user device matches what would be expected for the transaction.

In the process of FIGS. 6A/6B, a decision block 634 (FIG. 6B) may follow block 632. At decision block 634, the authentication system 202 may determine whether a fraud score produced at 632 is at a level (e.g., relative to a pre-determined threshold) so as to indicate that the risk of fraud is low or acceptable (i.e., the risk is not too high). If a positive determination is made at decision block 634 (i.e., if the fraud score is at least acceptable), then block 636 may follow decision block 634. At block 636, the authentication system 202 may omit any user authentication process that might otherwise be prescribed for the current transaction (e.g., a biometric user authentication, submission and verification of a PIN, etc.), and at the same time the authentication system 202 may indicate to the merchant for the current transaction (i.e., the later transaction) that the user is deemed to have been authenticated. For example, in some embodiments, the authentication system 202 may provide the same indication to the merchant as if a biometric user authentication had just been successfully completed with respect to the current transaction. Alternatively, in some embodiments, the indication from the authentication system 202 to the merchant may indicate that the authentication system 202 deems the user to have been authenticated without having performed a user authentication process for the current transaction.

Block 638 may follow block 636. At block 638, the merchant may complete the current transaction. This process stage may resemble the process stage described above with respect to block 620 (FIG. 6A). Of course, the actual data included in the authorization request in connection with block 638 will reflect the details of the later transaction rather than the earlier transaction. In some embodiments, if the authorization request for the later transaction includes an indication as to user authentication, such an indication may or may not indicate that the user authentication was "deemed" rather than "actual". With respect to either sort of indication, the same may be taken into account by the account issuer in performing a risk management process with respect to the authorization request.

Referring again to decision block 630 (FIG. 6B), if a negative determination is made at that point (i.e., if there is no relevant recorded prior user authentication), then block 640 may follow decision block 630. The process stage represented at 640 may include processes that resemble the process stages described previously with respect to blocks 610 and 612 (FIG. 6A), and thus may include performance of a biometric user authentication process or other user authentication process. Moreover, block 640 should also be understood to include process stages like those described above in connection with blocks 614, 616, 618 and 620 (i.e., successful user authentication, sending authentication result to merchant, completion of transaction, logging of transaction to history server computer 206).

Referring again to decision block 634 (FIG. 6B), if a negative determination is made at that point (i.e., if the fraud score obtained at 632 is not "OK"), then block 640, as just referred to above, may follow decision block 634.

Rules that may apply in connection with decision blocks 630 and/or 634 will now be further discussed. It is noted that, to a considerable extent, examples of rules of this kind have already been suggested by prior discussion, including the discussion of what is or may be considered a relevant recorded prior user authentication. In some embodiments, each account issuer may be permitted to register with the authentication system 202 and may be allowed to prescribe one or more rules to guide or control the determination of the authentication system 202 as to whether user authentication can be omitted for a given transaction. In some embodiments, the issuers may be permitted to prescribe different rules or sets of rules for different classes of payment accounts issued by the particular issuer.

In one example type of rule, user authentication may be skipped—for a certain class of payment accounts—for a low monetary amount/low risk transaction if there was a successful relevant biometric user authentication within the past 12 hours; for a high monetary amount/high risk transaction the user authentication may be skipped only if there was a successful relevant biometric user authentication within the past two hours. For the purposes of the example rules in the previous sentence, "relevance" implies that the payment account used in the previous transaction (i.e., the transaction for which biometric user authentication was successfully performed) was held in the same wallet with the account used for the current transaction and/or was held in a wallet that had an account in common with the wallet used in the previous transaction.

With a payment system such as the payment system 200, and particularly with a process as illustrated in FIGS. 6A/6B, convenience for the user may be enhanced by at least sometimes omitting user authentication processes for certain transactions, while also satisfying prudent approaches to transaction security. The omission of user authentication in some cases may promote completion of online purchase transactions, and may reduce the possibility that such transactions will be abandoned by users who do not wish to undergo user authentication for a given transaction.

It should be noted that the sequence of process stages may vary from the sequence explicitly illustrated in FIGS. 6A/6B. To provide just one example, fraud scoring could occur prior to a determination as to whether there is a relevant recent user authentication recorded for the same user.

The above description of certain embodiments has generally referred to use of biometric user authentication, but in alternative embodiments the principles of this disclosure may also or alternatively be applied to other types of user authentication, including user entry of PINS or passwords, authentication by presentation of physical authentication tokens, etc. In some embodiments, for example, a rule may provide that if there is a relevant recent biometric user authentication record for payment account A, then, in a subsequent transaction using payment account B (for which PIN user authentication would otherwise be required; and held in the same digital wallet), the user authentication may be omitted.

In embodiments discussed above, digital wallets were referred to as being held in computers operated by one or more wallet service providers (WSPs). However, in other embodiments, digital wallets may be hosted by one or more of WSPs, merchants and/or account issuers. In some embodiments, user authentication that occurs with reference to an account in a wallet held in one of these types of entities may cause user authentication to be omitted in a subsequent transaction using an account in a wallet held in a different one of these types of entities.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

As used herein and in the appended claims, a "server" includes a computer device or system that responds to numerous requests for service from other devices.

The flow charts and descriptions thereof herein should not be understood to prescribe a fixed order of performing the method steps described therein. Rather the method steps may be performed in any order that is practicable, including simultaneous performance of steps.

As used herein and in the appended claims, the term "payment card system account" includes a credit card account, a deposit account that the account holder may access using a debit card, a prepaid card account, or any other type of account from which payment transactions may be consummated. The terms "payment card system account" and "payment card account" and "payment account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual.

As used herein and in the appended claims, the term "payment card system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

Although the present disclosure has been described in connection with specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A method comprising:
   performing a first transaction using a first payment account, the first transaction including a successful authentication of a holder of the first payment account, the first transaction performed using a first digital wallet;
   storing a record of the first transaction, the stored record including an indication that the successful authentication occurred;
   receiving a request for a second transaction using a second payment account held by the holder of the first payment account, the second transaction different from the first transaction, the second transaction performed using a second digital wallet different from the first digital wallet;

detecting the indication of the successful authentication in the stored record of the first transaction;

applying a rule to the second transaction, the rule directing that the indication of the successful authentication is relevant to the second transaction in cases where a third payment account is held in both the first digital wallet and the second digital wallet;

determining that the rule is satisfied with respect to the second transaction; and in response to the determining step, completing the second transaction without requiring authentication of the account holder.

2. The method of claim 1, wherein the successful authentication is a biometric authentication.

3. The method of claim 2, wherein the detected indication indicates that the successful authentication was a biometric authentication.

4. The method of claim 1, wherein the successful authentication is not a biometric authentication.

5. A method comprising:

performing a first transaction using a first payment account, the first transaction including a successful authentication of a holder of the first payment account, the first transaction performed using a first digital wallet;

storing a record of the first transaction, the stored record including an indication that the successful authentication occurred; the stored record including an indication of a first point in time, the first point in time being a point in time when the successful authentication occurred;

receiving a request for a second transaction using a second payment account held by the holder of the first payment account, the second transaction different from the first transaction; the request for the second transaction being received at a second point in time later than the first point in time, the second transaction performed using a second digital wallet different from the first digital wallet;

detecting the indication of the successful authentication in the stored record of the first transaction;

comparing a time interval between the first and second points in time with a predetermined permissive time interval;

applying a rule to the second transaction, the rule directing that the indication of the successful authentication is relevant to the second transaction in cases where a third payment account is held in both the first digital wallet and the second digital wallet;

determining that the rule is satisfied with respect to the second transaction;

in response to the determining step, completing the second transaction without requiring authentication of the account holder in a case where the time interval between the first and second points in time does not exceed the predetermined permissive time interval; and requiring authentication of the account holder in connection with the second transaction in a case where the time interval between the first and second points in time exceeds the predetermined permissive time interval.

6. The method of claim 5, wherein the predetermined permissive time interval is defined by an issuer of the second payment account.

7. An apparatus comprising:

a processor;

a memory in communication with the processor, the memory storing program instructions, the processor operative with the program instructions to perform functions as follows:

performing a first transaction using a first payment account, the first transaction including a successful authentication of a holder of the first payment account, the first transaction performed using a first digital wallet;

storing a record of the first transaction, the stored record including an indication that the successful authentication occurred;

receiving a request for a second transaction using a second payment account held by the holder of the first payment account, the second transaction different from the first transaction, the second transaction performed using a second digital wallet different from the first digital wallet;

detecting the indication of the successful authentication in the stored record of the first transaction;

applying a rule to the second transaction, the rule directing that the indication of the successful authentication is relevant to the second transaction in cases where a third payment account is held in both the first digital wallet and the second digital wallet;

determining that the rule is satisfied with respect to the second transaction; and in response to the determining step, completing the second transaction without requiring authentication of the account holder.

* * * * *